United States Patent [19]
Deems et al.

[11] Patent Number: 5,546,588
[45] Date of Patent: Aug. 13, 1996

[54] METHOD AND APPARATUS FOR PREVENTING A DATA PROCESSING SYSTEM FROM ENTERING A NON-RECOVERABLE STATE

[75] Inventors: Vincent B. Deems; Gregory A. Racino; James R. Feddeler, all of Austin, Tex.; Victor E. Shiff, Waterbury, Conn.

[73] Assignee: Motorola Inc., Schaumburg, Ill.

[21] Appl. No.: 350,396

[22] Filed: Dec. 5, 1994

Related U.S. Application Data

[63] Continuation of Ser. No. 880,620, May 8, 1992, abandoned.
[51] Int. Cl.$^6$ ................................................. G06F 9/00
[52] U.S. Cl. ................... 395/750; 364/DIG. 1; 364/DIG. 2; 364/273; 364/273.1; 364/273.2; 364/273.3; 364/273.4
[58] Field of Search ............... 364/DIG. 1, DIG. 2; 395/250, 375, 500, 550, 750, 800

[56] References Cited

U.S. PATENT DOCUMENTS

| | | |
|---|---|---|
| 4,573,117 | 2/1986 | Boney ................................. 364/200 |
| 4,669,059 | 5/1987 | Little et al. ........................ 364/900 |
| 4,748,559 | 5/1988 | Smith et al. ....................... 364/200 |
| 4,758,945 | 7/1988 | Remedi ............................. 364/200 |

*Primary Examiner*—Robert B. Harrell
*Attorney, Agent, or Firm*—Susan C. Hill

[57] ABSTRACT

A method and apparatus for preventing a data processing system (10) from entering a non-recoverable state. In one form, the present invention uses a pin (40) to indicate whether or not the execution of a non-recoverable instruction is legal. If the pin indicates that the execution of the instruction is legal, then the instruction is executed and the data processing system (10) is placed into a state that requires an external stimulus in order to recover. If the pin indicates that the execution of the instruction is illegal, then the instruction is not permitted to place the data processing system (10) into a state that requires an external stimulus in order to recover. Instead, an internal recovery mechanism is provided which returns the data processing system (10) to normal processing.

20 Claims, 3 Drawing Sheets

5,546,588

METHOD AND APPARATUS FOR PREVENTING A DATA PROCESSING SYSTEM FROM ENTERING A NON-RECOVERABLE STATE

This application is a continuation of prior application Ser. No. 07/880,620, filed May 8, 1992 now abandoned.

FIELD OF THE INVENTION

The present invention relates in general to data processors, and more particularly to preventing a data processing system from entering a non-recoverable state.

BACKGROUND OF THE INVENTION

Many of today's microcontroller integrated circuits have a low power mode. Various names such as "stop", "halt", and "sleep", among others, can be used to describe this low power mode. The purpose of placing an integrated circuit in this low power mode is to reduce the overall power consumption of the integrated circuit. Because many microcontroller applications use a battery as the source of power, it is very important that the microcomputer have a mode in which it uses a minimum amount of power. For example, microcomputer applications such as pagers, watches, cellular telephones, portable computers, etc. generally require the microcomputer to consume as little power as possible.

A low power mode may utilize one or more methods to reduce the power consumption of the integrated circuit. One of the common ways to reduce power consumption of the integrated circuit is to stop some or all of the clocks used to clock the circuitry. An integrated circuit usually consumes less power when the circuitry is not being clocked.

A common way of entering a low power mode is to use a software instruction which is executed by the central processing unit (CPU). The MC68HC11 and MC68HC05 families of microcomputers, available from Motorola, Inc. of Austin, Tex., have a "stop" mode which is used as a low power mode. This stop mode is entered when the CPU executes a "STOP" instruction. The execution of this STOP instruction causes the integrated circuit to enter a low power mode in which power consumption is reduced by stopping all of the clocks on the integrated circuit.

However, if all of the clocks on the integrated circuit are stopped, the problem then arises as to how to get the integrated circuit out of stop mode. If none of the clocks on the integrated circuit are functioning, then the microcomputer cannot perform data processing functions. Thus, an integrated circuit pin that receives a signal from outside the microcomputer is generally used in order to exit stop mode. This pin receives a signal which indicates to the microcomputer that the microcomputer should restart the internal clocks and should exit stop mode.

Existing data processing systems having microcomputers can use one of a number of microcomputer pins in order to recover from stop mode. For example, Motorola's MC68HC11 and MC68HC05 microcomputers use either the reset pin or the interrupt request (IRQ) pin to exit and recover from stop mode. Asserting the reset pin causes the microcomputer to initialize itself to a predetermined reset state, regardless of the microcomputer's present state. Resetting the microcomputer to this initial state includes the step of restarting the clocks. Asserting the IRQ pin causes the microcomputer to restart the clocks and to begin executing an interrupt software routine.

Note that stop mode can also be exited by cycling the microcomputer's power source (i.e. turning the power off and then on again). But this is not generally a desirable way to exit stop mode because of other effects that result from the loss of power (e.g. the contents of some memories can be lost if power is cycled).

Unfortunately, the STOP instruction presents a serious reliability problem to applications (e.g. certain watches, pagers, telephones, etc.) that have no method available to assert the reset pin or the IRQ pin. There is no way for the person using such a product to assert pins on the microcomputer inside the product without first disassembling the product. The STOP instruction is a reliability problem to these applications because the inadvertent execution of a STOP instruction will stop the microcomputer with no apparent means available to exit stop mode and restart the microcomputer. The microcomputer will thus remain in stop mode until the product is disassembled at the repair shop. Thus, the inadvertent execution of a single STOP instruction makes the product stop working. Obviously, this is not acceptable to product users or manufacturers.

There are two primary causes for the inadvertent execution of a STOP instruction. The first cause is a software error, such as runaway software or an erroneous STOP instruction, that mistakenly directs the CPU to execute a STOP instruction. The second cause is some type of electrical disturbance, such as noise or electrostatic discharge. As an example, the register or latches containing the binary code of a new instruction to be executed by the CPU can be subject to an electrical disturbance. If the electrical disturbance changes one or more of the bits of the binary code, the register may erroneously contain the binary code for a STOP instruction. The CPU will thus execute a STOP instruction that the user did not intend and did not include in the software program.

As an added layer of protection some microcomputers, such as Motorola's MC68HC11, use one or both of the following safeguards against an inadvertent STOP instruction. The first safeguard is a register control bit to disable the STOP instruction. If the user programs the control bit to be a first binary state, the STOP instruction will carry out its intended function and will stop the clocks. But if the user programs the bit to be the other binary state, the STOP instruction will not be performed and the clocks will not be stopped.

The second safeguard is a clock monitor circuit to recover from an inadvertent STOP instruction. The clock monitor circuit resets the microcomputer based on an internal RC (resistor-capacitor) delay if the clocks become too slow or stop. A control bit is used to enable or disable the clock monitor circuit, depending upon whether the user wants to allow the microcomputer to enter stop mode.

The disadvantage of both of these safeguards is that each requires the use of a software accessible control bit that must be in the proper state. But if the source of the problem is runaway software that inadvertently executes a STOP instruction, the runaway software may also inadvertently change the value of the control bit. Both of these safeguards make it less likely that runaway software will enter stop mode because two steps, rather than one step, must now be performed in order to enter stop mode. That is, in order to inadvertently enter stop mode, first a control bit must be placed in the proper state, and then the STOP instruction must be executed. Although both of these safeguards offer some improvement, they are unfortunately still susceptible to runaway software.

SUMMARY OF THE INVENTION

The previously mentioned needs are fulfilled and other advantages achieved with the present invention. In one form, the present invention is an apparatus and a method for preventing a microcomputer from entering a non-recoverable state. In one embodiment, the microcomputer has a plurality of terminals. The method includes the step of receiving a first instruction which, if fully executed, is capable of placing the microcomputer in the non-recoverable state. The method also includes the step of determining whether one of the terminals is in a first state or a second state. The method further includes the step of fully executing the first instruction if the one of the terminals is in the first state. And lastly, the method includes the step of preventing the microcomputer from entering the non-recoverable state if the one of the terminals is in the second state.

The present invention will be understood by one skilled in the art from the detailed description below in conjunction with the accompanying drawings.

DESCRIPTION OF THE PREFERRED EMBODIMENT

The terms "assert" and "negate" will be used when referring to the rendering of a signal, status bit, or similar apparatus into its logically true or logically false state, respectively. "Active" is used to describe a signal, status bit, or similar apparatus that has been asserted. "Non-active" is used to describe a signal, status bit, or similar apparatus that has been negated. The present invention is applicable to any instruction which is capable of placing the microcomputer in a non-recoverable state. A non-recoverable state is a state in which the microcomputer is not performing normal processing (i.e. is not executing instructions) and in which the user of the microcomputer is unable to cause the microcomputer to resume normal processing.

For convenience, the instruction that will be described in this specification as an example of an instruction that is capable of placing the microcomputer in a non-recoverable state is a STOP instruction. The STOP instruction places the microcomputer in a low power stop mode by causing all of the clocks on the microcomputer to stop. The STOP instruction causes the microcomputer to stop performing normal processing. Thus the microcomputer cannot execute instructions when the microcomputer is in stop mode. If an external signal is needed for the microcomputer to exit STOP mode and return to normal processing, and the microcomputer is used in an application that restricts the user's access to the microcomputer pins, it is possible for the STOP instruction to place the microcomputer in a non-recoverable state.

An instruction, such as STOP, that stops the clocks in a microcomputer chip is very useful for some products (e.g. products that require low power) and a serious reliability threat for other products (e.g. products that limit the user's access to microcomputer pins). In fact for some types of products, the STOP instruction can be both a useful asset and a reliability threat. A solution was needed that would accommodate the needs of various types of products. In addition, customers were not satisfied with existing safeguards that were still susceptible to runaway software.

Figure 1:
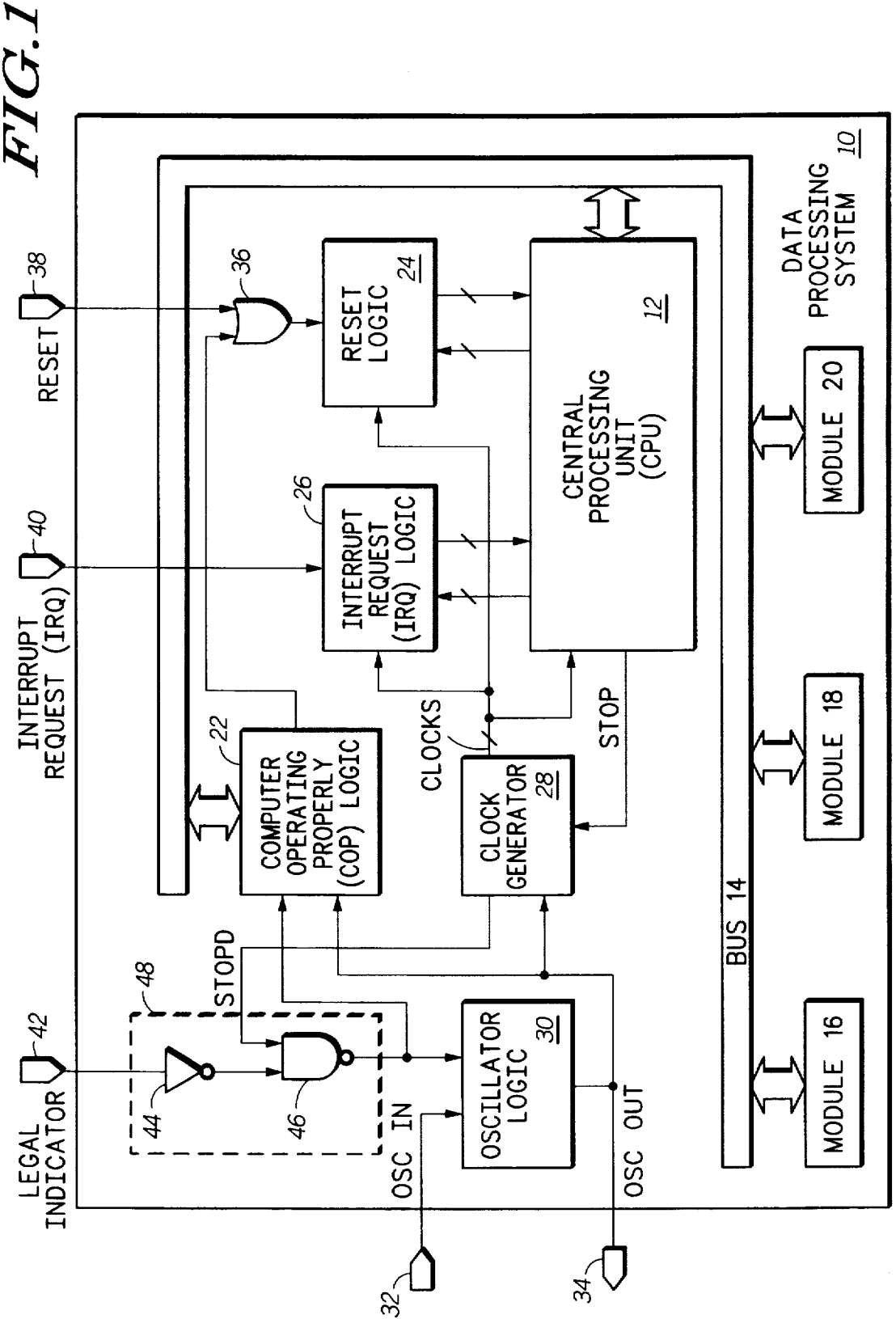
FIG. 1 illustrates, in partial block diagram form and partial logic diagram form, a data processing system in accordance with one embodiment of the present invention.

FIG. 1 illustrates a data processing system 10 having a central processing unit (CPU) 12 which is bi-directionally coupled across a bus 14 to a module 16, a module 18, and a module 20. Modules 16, 18, and 20 are logic circuits that performed particular types of functions. For example, in most microcomputers at least one of the modules will be some type of memory. Modules are also commonly timers, serial interfaces, analog to digital converters, and other various customized functions. CPU 12 is also bi-directionally coupled across bus 14 to a computer operating properly (COP) logic circuit 22. The CPU 12 sends and receives signals from a reset logic circuit 24. The CPU 12 also sends and receives signals from an interrupt request (IRQ) logic circuit 26.

Reset logic 24 and IRQ logic 26 both receive one or more clock signals from a clock generator circuit 28. CPU 12 also receives one or more clocks from clock generator 28. The output of clock generator 28 is labeled "Clocks". Note that all of the circuitry in data processing system 10 which requires a clock to function receives a clock (not shown) either directly or indirectly from the output of clock generator 28.

CPU 12 provides a Stop signal to clock generator 28. An oscillator logic circuit 30 receives an Osc In signal from an integrated circuit input pin 32. Oscillator logic 30 provides an Osc Out signal to an integrated circuit output pin 34, to the clock generator 28, and to the COP logic 22. An external crystal (not shown) can be connected across integrated circuit input pins 32 and 34. Alternatively, an oscillating signal can be input directly into integrated circuit input pin 32. An output signal provided by the COP logic 22 is an input to an OR gate 36. A signal provided by a reset integrated circuit input pin 38 is also an input to OR gate 36. The output of OR gate 36 is provided as an input to the reset logic 24. A signal provided by an interrupt request (IRQ) integrated circuit input pin 40 is an input to IRQ logic 26.

A Legal Indicator signal is provided from an integrated circuit input pin 42 to the input of an inverter 44. The output of inverter 44 is an input to a NAND gate 46. Clock generator 28 provides a Stopd signal which is also an input to NAND gate 46. The output of NAND gate 46 is an input to oscillator logic 30. Together, inverter 44 and NAND gate 46 form combinational logic 48.

Figure 2:
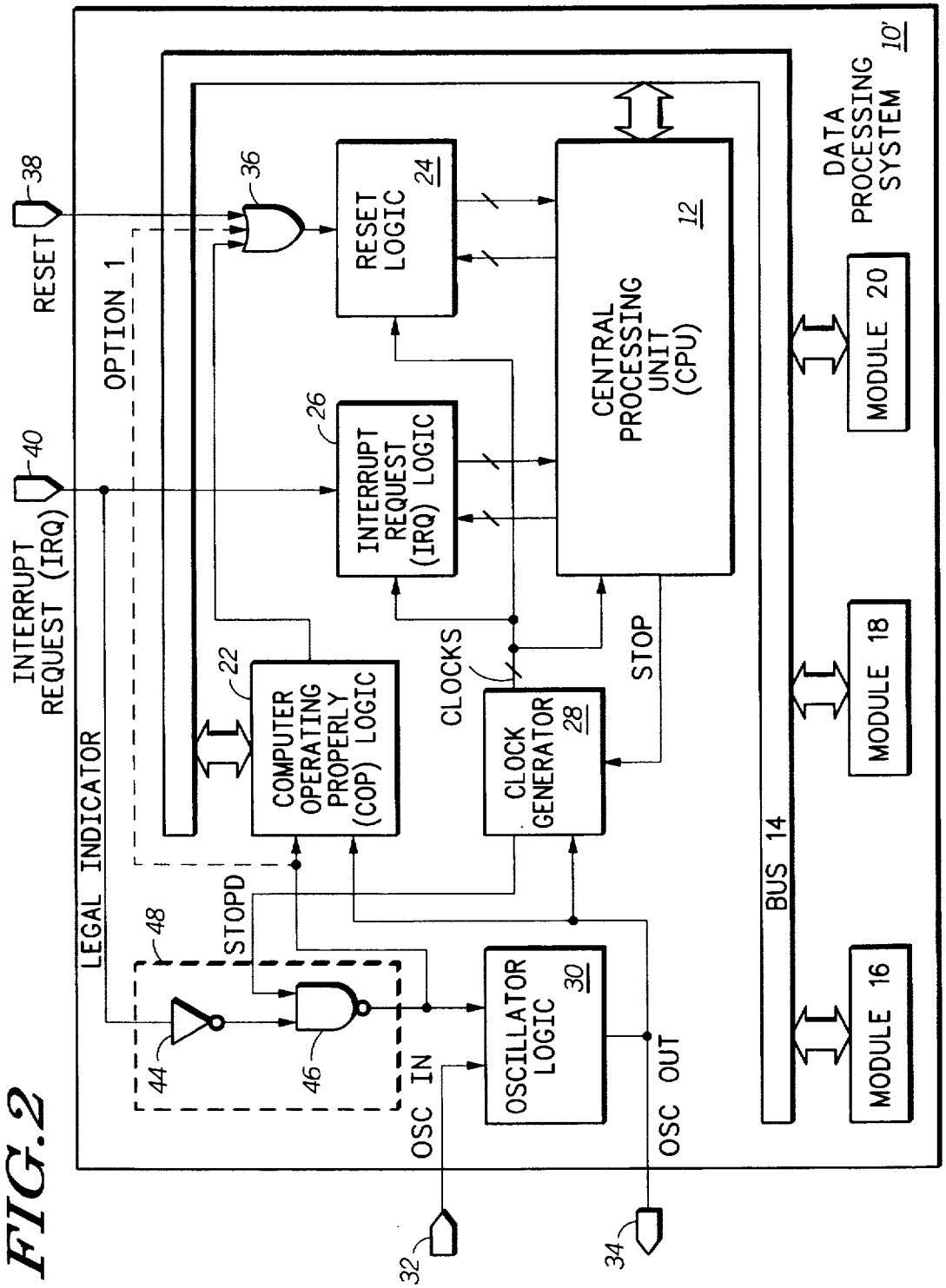
FIG. 2 illustrates, in partial block diagram form and partial logic diagram form, a data processing system in accordance with another embodiment of the present invention.
Figure 3:
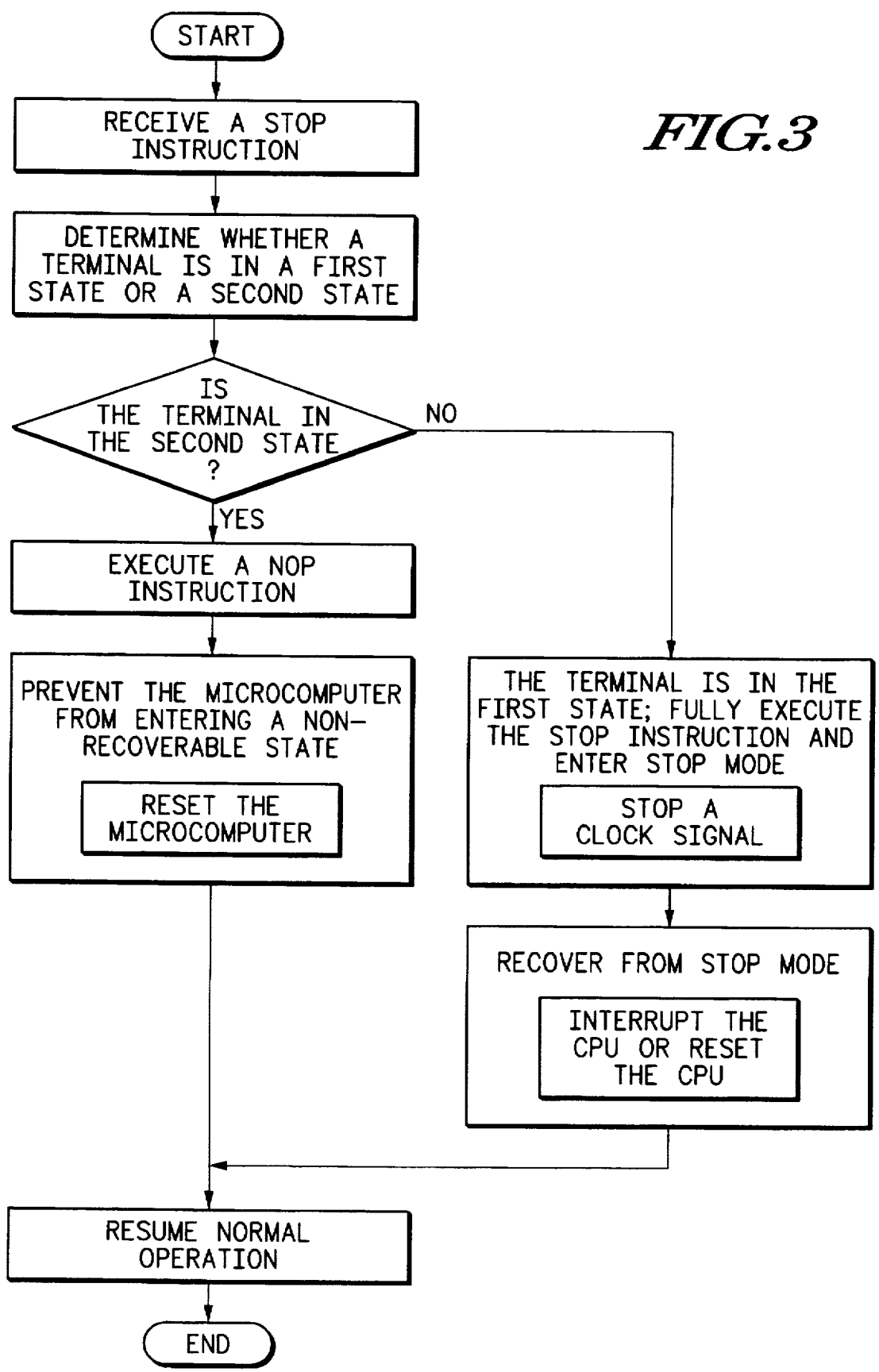
FIG. 3 illustrates, in flow diagram form, a method for preventing a data processing system from entering a non-recoverable state in accordance with one embodiment of the present invention.

FIG. 2 illustrates a data processing system 10' in which identical elements from data processing system 10 are numbered using the same numbers. Data processing system 10' is identical to data processing system 10 with the following exceptions. First, IRQ pin 40 is used in place of input pin 42 to provide the Legal Indicator signal to inverter 44. Second, a dotted line connection labeled "option 1" is illustrated. The purpose of this dotted line connection is to indicate that the output of NAND gate 46 provides an input signal to OR gate 36 when option 1 is implemented. This connection is not required if option 1 is not implemented.

The operation of the present invention will now be described. When the data processing system 10 is performing normal processing, CPU 12 continually receives instructions across bus 14 and executes those instructions. In some microcomputer applications, the software instructions are stored in a memory module such as module 16, 18, or 20. If an external memory is used to store the instructions, bus 14 must receive the instructions from an external bus (not shown) which is normally coupled to the internal bus 14 by means of integrated circuit pins. CPU 12 then executes the instructions that it receives across bus 14.

If CPU 12 receives a STOP instruction, the CPU 12 internally executes that STOP instruction. One of the steps that the CPU 12 performs while it is executing the STOP instruction is the assertion of the Stop signal. When the clock generator 28 receives an asserted Stop signal, the clock generator 28 performs an orderly shutdown of all of the clocks which it generates and provides to the rest of the data processing system 10. In this manner, all of the modules 16, 18, and 20 are brought to a predetermined state before the clocks are all stopped. Stopping all of the clocks places the data processing system 10 into a low power stop mode in which the circuitry consumes less power than during normal processing.

For application which allow the user to access either the reset pin 38 or the IRQ pin 40, the user of the data processing system 10 merely asserts one of those two pins, pin 38 or 40, in order to restart the clocks and recover from stop mode. Asserting the reset pin 38 causes the microcomputer to initialize itself to a predetermined reset state, regardless of the microcomputer's present state. Resetting the microcomputer to this initial state includes the step of restarting the clocks. Asserting the IRQ pin 40 causes the microcomputer to restart the clocks and to begin executing an interrupt software routine. However, in some applications it is best not to allow the user to directly access either the reset pin 38 or the IRQ pin 40. If the user had direct access to these pins, the user could inadvertently cause a reset or an interrupt request.

As an example, if data processing system 10 is a microcomputer which is used in a liquid-crystal display (LCD) wristwatch, the microcomputer is completely encapsulated in the wristwatch and the user has no direct access to either the reset pin 38 or the IRQ pin 40. The only indirect access that the user may have is that the user may remove the back from the wristwatch if the wristwatch is malfunctioning or requires a new battery. The wristwatch can be designed so that the removal of the back causes a pin of the microcomputer to be asserted.

However, this does not solve the problem of inadvertently executed STOP instructions. The goal is to prevent the microcomputer from entering a non-recoverable state. In this case, that means not stopping the microcomputer clocks to begin with; because once the clocks are stopped, the face of the watch will go blank and the user will consider the watch to be defective. Causing the reset pin 38 or the IRQ pin 40 to be asserted every time the back of the watch is removed will bring the microcomputer out of stop mode and will "fix" the watch. But a user does not want to have the face of his watch randomly go blank because the microcomputer inadvertently executed a STOP instruction. Even if the user can "fix" the watch by removing the back, the user will consider it to be defective and unreliable because it can go blank at any time.

A solution was needed that: (1) would allow the clocks to stop when a STOP instruction was intentionally executed; (2) would prevent the clocks from stopping when a STOP instruction was inadvertently executed; and (3) did not rely on the value of a control bit that could be corrupted by runaway software. It was crucial to find a way to prevent the clocks from stopping when a STOP instruction was inadvertently executed. The standard method of using either the reset pin 38 or the IRQ pin 40 was inadequate because these two pins merely provided a way to restart the clocks once they had already stopped. The requirement was to prevent the clocks from stopping in the first place. A register control bit to disable the STOP instruction and a clock monitor circuit were both dependent on the value of a control bit, and thus were susceptible to corruption by runaway software.

The present invention meets all three of the above requirements. The present invention operates as follows. After clock generator 28 has performed an orderly shutdown of all of the clocks which it generates, clock generator 28 then provides a Stopd signal as an input to NAND gate 46. The "d" in Stopd indicates that the assertion of the Stopd signal is delayed compared to the Stop signal provided by CPU 12. The delay is the amount of time required by clock generator 28 to perform an orderly shutdown of all of the clocks. A Legal Indicator signal from integrated circuit pin 42 is also provided as an input to NAND gate 46.

The Legal Indicator signal qualifies the Stopd signal by indicating whether the STOP instruction being executed by CPU 12 is intentional and thus "legal", or whether the STOP instruction being executed by CPU 12 is inadvertent and thus "illegal". On pin 42, either a steady state logic level or a transition from one logic level to another can be used to indicate whether an instruction is legal or illegal. The present embodiment illustrated in FIG. 1 uses the logic level on pin 42 to indicate whether the STOP instruction is legal or illegal.

Although inverter 44 and NAND gate 46 were used in the present embodiment, other logic circuits could have been used. What is important is that the output of combinational logic 48, in this embodiment the output of NAND gate 46, should only be asserted when both: (1) the Stopd signal indicates that CPU 12 has received a STOP instruction; and (2) the Legal Indicator signal indicates that the STOP instruction is legal. Only when both conditions (1) and (2) are met does combinational logic 48 provide to oscillator logic 30 an asserted signal which indicates that oscillator logic 30 should shut down and stop generating the Osc Out signal.

The Osc Out signal from oscillator logic 30 is provided as an input to both the COP logic 22 and the clock generator 28. The clock generator 28 requires the Osc Out signal in order to generate clocks. The COP logic 22 uses the Osc Out signal to increment a time-out counter (not shown).

If the Osc Out signal is provided to COP logic 22, the time-out counter (not shown) in COP logic 22 counts up to a predetermined value. When that predetermined value is reached by the time-out counter (not shown), COP logic 22 provides an asserted output signal that is input to OR gate 36. The assertion of this output signal from COP logic 22 causes the output of OR gate 36 to be asserted; and consequently causes reset logic 24 to initiate a reset of the data processing system 10. Note that when the output of combinational logic 48 is first asserted, the time-out counter (not shown) in COP logic 22 is reset to its initial counting value before it begins counting up to the predetermined value.

COP logic 22 functions as a software watchdog timer which times out and resets the data processing system 10 when COP logic 22 is not properly serviced by the software. For more information on the operation of a computer operating properly (COP) circuit, see the MC68HC11 Reference Manual available from Motorola, Inc.

Returning to a previous example, if data processing system 10 is a microcomputer which is used in a liquid-crystal display (LCD) wristwatch, the wristwatch can be designed so that the removal of the back causes a pin of the microcomputer to be asserted. In this example, pin 42, and therefore the Legal Indicator signal, can be asserted when the back of the wristwatch is removed. In this example then, the assertion of the Legal Indicator signal indicates that the STOP instruction is now legal.

Once the back of the watch is removed, there is no longer a need to protect against the inadvertent execution of a STOP instruction. Also, once the back of the watch is removed, the software may execute a legal STOP instruction to conserve power and preserve memory. A user of the watch generally will not consider the watch to be defective if the face goes blank from either an inadvertent or intentional execution of the STOP instruction when the back of the watch is removed.

However, once the back of the watch is put back in place, the microcomputer must once again protect against the inadvertent execution of a STOP instruction by negating the pin 42, and thereby negating the Legal Indicator signal. Because the Legal Indicator signal is once again negated, the output of combinational logic 48 is negated. And when oscillator logic 30 receives the negated output signal of combinational logic 48, oscillator logic 30 does not shut down but continues to generate the Osc Out signal. If the oscillator logic 30 had been shut down when the back of the watch was off, replacing the back of the watch will restart oscillator logic 30.

So if CPU 12 receives an inadvertent STOP instruction while the back of the watch is on, CPU 12 will assert the Stop signal to clock generator 28. As a result of receiving an asserted Stop signal, clock generator 28 will perform an orderly shutdown of all of the clocks which it generates. In addition, clock generator 28 will provide an asserted Stopd signal to combinational logic 48. Note that in the disclosed embodiment, an asserted Stopd signal is a logic level one, and an asserted Legal Indicator signal is a logic level one, and an asserted output signal form combinational logic 48 is a logic level one. Because the Legal Indicator signal is presently negated, a logic level zero in the disclosed embodiment, the output of combinational logic 48 is negated. Thus oscillator logic 30 receives a negated output signal from combinational logic 48 and oscillator logic 30 continues to generate the Osc Out signal.

Although clock generator 22 is performing an orderly shutdown of all of the clocks in the data processing system 10, the oscillator logic 30 is continuing to provide the Osc Out signal to COP logic 22. The time-out counter (not shown) in COP logic 22 will eventually time-out and initiate a reset of the data processing system 10. The time-out counter (not shown) in COP logic 22 usually takes only a fraction of a second to initiate a reset in most microcomputers.

Thus, although the watch face may flicker for a fraction of a second if an inadvertent STOP instruction is executed by the CPU, the watch will immediately recover and continue to operate. If the present invention was not used, the microcomputer would enter a non-recoverable state in which the microcomputer would not be able to automatically recover without receiving some external stimulus on the microcomputer pins, such as having the user remove the back of the watch. The present invention thus prevents a data processing system from entering a non-recoverable state.

FIG. 2 illustrates another embodiment of the present invention. In order to reduce the total number of integrated circuit pins required by data processing system 10, the IRQ pin 40 is used as both an interrupt request pin and as a legal indicator pin. In the illustrated embodiment, an IRQ control bit (not shown) is used by the programmer to select which logic level, a logic level zero or a logic level one, will cause an interrupt.

However, in the illustrated embodiment, the circuitry used to implement combinational logic 48 requires that the asserted state of the Legal Indicator signal be a logic level one. Thus a logic level one on IRQ pin 40 indicates that a STOP instruction is legal. The programmer then has the choice, using the IRQ control bit (not shown), of determining whether an interrupt request will be generated when the Legal Indicator signal is asserted or when the Legal Indicator signal is negated.

The dotted line labeled "option 1" shows an additional option that is available. If the output of combinational logic 30 is provided to the input of OR gate 36, as illustrated by option 1, then the data processing system 10' can be reset without waiting for the COP logic 22 to time-out. If option 1 is used, the assertion of the output signal from combinational logic 48 causes the output of OR gate 36 to be asserted; and consequently causes reset logic 24 to initiate a reset of the data processing system 10'.

In summation, the above specification describes a method and apparatus for preventing a data processing system from entering a non-recoverable state. Some microcomputer applications require the functionality provided by the present invention.

While the present invention has been illustrated and described with reference to specific embodiments, further modifications and improvements will occur to those skilled in the art. For example, various circuits could be used to implement combinational logic 48. The reset pin 38, instead of the IRQ pin 40, could be used to provide the Legal Indicator signal. Alternatively, other microcomputer pins (not shown) could be used to provide the Legal Indicator signal. The Osc In signal may be generated by a crystal (not shown) or another integrated circuit (not shown). The COP logic 22 may or may not be used in embodiments of the present invention that use option 1. When the STOP instruction is illegal, a no operation (NOP) instruction may be executed by the CPU 12 instead of the STOP instruction. A NOP instruction in an instruction that increments the program counter but does not affect any other registers.

It is to be understood, therefore, that this invention is not limited to the particular forms illustrated and that it is intended in the appended claims to cover all modifications that do not depart from the spirit and scope of this invention.

We claim:

1. A method for preventing a microcomputer from entering a non-recoverable state, the microcomputer having a terminal for communicating external to the microcomputer, the method comprising steps of:

receiving a first instruction which, if fully executed, is capable of placing the microcomputer in the non-recoverable state;

receiving an input signal from external to the microcomputer at the terminal, the input signal having a logic state that is not software programmable by the microcomputer;

determining whether the logic state of the input signal is a first state or a second state;

after said step of determining, fully executing the first instruction if the logic state of the input signal is the first state; and after said step of determining, preventing the microcomputer from entering the non-recoverable state if the logic state of the input signal is the second state.

2. A method as in claim 1, further comprising a step of:

after said step of determining, executing a second instruction in place of the first instruction if the logic state of the input signal is the second state.

3. A method as in claim 2, wherein the second instruction is a no operation (NOP) instruction.

4. A method as in claim 1, wherein the step of fully executing the first instruction comprises a step of:

stopping a clock signal.

5. A method as in claim 1, further comprising a step of:

after said step of determining, interrupting a central processing unit (CPU) if the logic state of the input signal is a predetermined one of the first and second states.

6. A method as in claim 1, further comprising a step of:

after said step of determining, resetting a central processing unit (CPU) if the logic state of the input signal is a predetermined one of the first and second states.

7. A method as in claim 1, wherein the step of preventing the microcomputer from entering the non-recoverable state comprises a step of:

resetting the microcomputer.

8. A data processing system, comprising:

a central processing unit (CPU) for receiving and executing a plurality of instructions, including a first instruction;

an integrated circuit terminal for receiving a control signal from external to the data processing system, the control signal having one of a first state and a second state;

a first clock circuit for generating a clock signal; and a second clock circuit for stopping the clock signal when said CPU has received the first instruction and the control signal is in the first state, and for continuing to generate the clock signal when said CPU has received the first instruction and the control signal is in the second state, said second clock circuit being coupled to said CPU, said integrated circuit terminal, and said first clock circuit; and wherein said CPU is unable to change the control signal from the first state to the second state, and wherein said CPU is unable to change the control signal from the second state to the first state.

9. A data processing system as in claim 8, wherein a second instruction is executed in place of the first instruction when the first instruction is received by said CPU and the control signal is in the second state.

10. A data processing system as in claim 9, wherein the second instruction is a no operation (NOP) instruction.

11. A data processing system as in claim 8, further comprising:

a reset circuit for resetting said CPU to an initial state when said CPU has received the first instruction and the control signal is in the second state, said reset circuit being coupled to said CPU and to said second clock circuit.

12. A data processing system as in claim 8, further comprising:

an interrupt circuit for interrupting said CPU, said interrupt circuit being coupled to said integrated circuit terminal.

13. A data processing system as in claim 8, wherein said CPU further comprises:

means for generating a stop signal in response to receiving the first instruction.

14. A data processing system as in claim 8, wherein the first instruction is executed by said CPU regardless of whether the first instruction is legal or illegal.

15. A data processing system, comprising:

a first clock signal;

a second clock signal;

a stop signal;

a delayed stop signal;

a central processing unit (CPU) for executing N instructions where N is a total number of instructions, the N instructions include a stop instruction, said CPU asserting the stop signal after receiving the stop instruction;

an integrated circuit terminal for receiving a first control signal having a first state which indicates that the stop instruction is legal and having a second state which indicates that the stop instruction is illegal, the first control signal being received from external to the data processing system, the first control signal being unaffected by any of the N instructions;

a first clock circuit for receiving a second control signal and for generating the first clock signal when the second control signal is negated;

a second clock circuit for receiving the first clock signal and the stop signal, for generating the second clock signal when the stop signal is negated, for stopping generation of the second clock signal when the stop signal is asserted, and for asserting the delayed stop signal when generation of the second clock signal is stopped; and a logic circuit for receiving the delayed stop signal, and for asserting the second control signal when both the delayed stop signal is asserted and the first control signal indicates that the stop instruction is legal, said logic circuit being coupled to said integrated circuit terminal.

16. A data processing system as in claim 15, further comprising:

a timer circuit for receiving the first clock signal and for using the first clock signal to count, said timer circuit asserting a reset signal when said timer circuit counts to a predetermined value.

17. A data processing system as in claim 16, further comprising:

a reset circuit for receiving the reset signal and for resetting the CPU to an initial state when the reset signal is asserted, said reset circuit being coupled to said CPU and to said timer circuit.

18. A data processing system as in claim 17, wherein said second clock circuit resumes generating the second clock signal after the reset signal is asserted.

19. A data processing system as in claim 18, wherein said timer circuit receives the second control signal and is set to an initial counting value when the second control signal is asserted.

20. A data processing system as in claim 15, wherein said first clock circuit stops generating the first clock signal when the second control signal is asserted.

* * * * *